US012158950B1

(12) United States Patent
Lee et al.

(10) Patent No.: US 12,158,950 B1
(45) Date of Patent: Dec. 3, 2024

(54) COMPUTER-IMPLEMENTED TOOL THAT FACILITATES MALWARE DETECTION

(71) Applicant: National Technology & Engineering Solutions of Sandia, LLC, Albuquerque, NM (US)

(72) Inventors: Jina Lee, Mountain View, CA (US); Christopher B. Harrison, Livermore, CA (US); Michael Bierma, Dublin, CA (US); Kina Kincher-Winoto, Livermore, CA (US); David Kavaler, Dublin, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 331 days.

(21) Appl. No.: 17/154,358

(22) Filed: Jan. 21, 2021

(51) Int. Cl.
*G06F 21/55* (2013.01)
*G06F 21/56* (2013.01)

(52) U.S. Cl.
CPC .......... *G06F 21/554* (2013.01); *G06F 21/552* (2013.01); *G06F 21/564* (2013.01)

(58) Field of Classification Search
CPC ..... G06F 21/554; G06F 21/552; G06F 21/564
See application file for complete search history.

(56) References Cited

U.S. PATENT DOCUMENTS

| | | | |
|---|---|---|---|
| 8,935,677 B2 | 1/2015 | Cui et al. | |
| 9,294,486 B1 | 3/2016 | Chiang et al. | |
| 10,354,069 B2 | 7/2019 | Gray et al. | |
| 10,372,909 B2 | 8/2019 | Wray et al. | |
| 2013/0326625 A1* | 12/2013 | Anderson | G06F 21/566 726/23 |
| 2015/0033339 A1* | 1/2015 | Geffner | G06F 21/56 726/23 |
| 2017/0017793 A1* | 1/2017 | Davis | G06N 3/08 |
| 2020/0296124 A1* | 9/2020 | Pratt | H04L 63/1416 |

(Continued)

FOREIGN PATENT DOCUMENTS

WO WO-2017197519 A1 * 11/2017 ......... G06F 16/9024
WO WO-2022097798 A1 * 5/2022

OTHER PUBLICATIONS

Comparetti, P. M. • Salvaneschi, G. • Kirda, E. • Kolbitsch, C. • Kruegel, C. • Zanero, S.; Identifying Dormant Functionality in Malware Programs; 2010 IEEE Symposium on Security and Privacy (2010, pp. 61-76); (Year: 2010).*

(Continued)

*Primary Examiner* — Luu T Pham
*Assistant Examiner* — Chao Wang
(74) *Attorney, Agent, or Firm* — Calfee, Halter & Griswold LLP; Gregory M. Doudnikoff

(57) ABSTRACT

Described herein are technologies related to generation of a summary of a function in binary code for review by an analyst. A first sequence to sequence model is configured to receive binary code (or a derivative thereof) and translate the binary code to an intermediate representation of the binary code, wherein the intermediate representation approximates source code for the binary code. A second sequence to sequence model is configured to receive the intermediate representation of the binary code and translate the intermediate representation to a human-readable summary of the binary code.

17 Claims, 6 Drawing Sheets

(56) References Cited

U.S. PATENT DOCUMENTS

2021/0173624 A1\* 6/2021 Krishnamoorthy ........................
G06F 11/0751
2022/0121429 A1\* 4/2022 Haile ...................... G06N 3/08

OTHER PUBLICATIONS

Rinu Rani Jose • A Salim; Malware Variants Detection Methods; 2019 IEEE International Conference on Innovations in Communication, Computing and Instrumentation (ICCI) (2019, pp. 196-201); (Year: 2019).\*

Moser • C. Kruegel • E. Kirda ; Limits of Static Analysis for Malware Detection; Twenty-Third Annual Computer Security Applications Conference (ACSAC 2007) (2007, pp. 421-430); (Year: 2007).\*

Shun Tobiyama, Yukiko Yamaguchi, Hirokazu Hasegawa, Hajime Shimada, Mitsuaki Akiyama, Takeshi Yagi; Using Seq2Seq Model to Detect Infection Focusing on Behavioral Features of Processes; Journal of Information Processing vol. 27 545-554 (Sep. 2019); (Year: 2019).\*

\* cited by examiner

COMPUTER-IMPLEMENTED TOOL THAT FACILITATES MALWARE DETECTION

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Malware is computer software that is intended to damage or disable computers and/or computer systems (i.e., software that is designed to interfere with normal functioning of a computer, where the software can be employed to commit cybercrime, such as acquiring passwords, personal identification numbers, and other sensitive data). Exemplary malware types include computer viruses, worms, Trojan horses, ransomware, spyware, adware, scareware, amongst others. An exemplary conventional approach for detecting and/or analyzing malware in computer software is binary reverse engineering. Binary reverse engineering refers to the process of dissecting a program binary to understand its behavior and functionality by examining its internal processes.

Various computer-implemented approaches have been developed to facilitate binary reverse engineering. These exemplary approaches include the use of a disassembler and/or the use of a decompiler. Generally, a computer-implemented disassembler is configured to translate binary code into assembly language, wherein assembly language can be read and understood by a skilled reverse engineer. A computer-implemented decompiler is configured to receive binary code as input and output source code that corresponds to the binary code, such that if the source code could be compiled, the binary code would be formed. Conventional disassemblers and decompilers, however, rely on fairly rigid rules to perform their respective functions and are therefore often not well suited to identify newly developed malware.

SUMMARY

The following is a brief summary of subject matter that is described in greater detail herein. This summary is not intended to be limiting as to the scope of the claims.

Described herein are various technologies that pertain to generating human-readable summaries of functions existent in binary code. With more specificity, a computer-implemented pipeline that comprises two separate sequence to sequence models is employed to translate a function in binary code to a summary of such function in human-readable language (such as English). It is to be noted that the term "human-readable language" does not encompass programming languages employed to generate source code, where exemplary programming languages include C, C++, Python, scripting languages, etc.

In an exemplary embodiment, a first sequence to sequence model is configured to receive computer-executable code. For instance, the computer-executable code can be binary code (or hexadecimal code). In another example, the computer-executable code can be disassembled binary or decompiled binary. The first sequence to sequence model is configured to output an intermediate representation of the computer-executable code that was provided as input to the first sequence to sequence model. In an example, the intermediate representation of the computer-executable code can be an approximation of source code in a suitable programming language. The second sequence to sequence model is configured to receive the intermediate representation of the computer-executable code and output a human-readable summary (in a human-readable language) of the computer-executable code based upon the intermediate representation of the computer-executable code. The summary of the computer-executable code can then be displayed on a display of a computing device, where the computing device is operated by an analyst who is tasked with reverse engineering the computer-executable code. Further, and optionally, malware detection software can analyze the computer-executable code, the intermediate representation, and/or the summary of the computer-executable code and can ascertain whether the computer-executable code is associated with malware. When the malware detection software determines that the computer-executable code is associated with malware, an indication can be output to the analyst that the computer-executable code may be associated with malware.

The first sequence to sequence model (configured to translate computer-executable code into an intermediate representation of the computer-executable code) is trained based upon training data that comprises pairs that include: 1) computer-executable code; and 2) source code that corresponds to the computer-executable code. Similarly, the second sequence to sequence model (configured to translate between intermediate representations of computer-executable code and human-readable summaries of the computer executable code) is trained based upon training data that comprises pairs that include: 1) source code; and 2) human-readable summaries that correspond to the source code. In an example, the human-readable summaries of the source code may be comments inserted by developers into the source code. Moreover, various data cleaning and preprocessing techniques are described in greater detail herein, wherein such techniques facilitate training the sequence to sequence models to allow such models to output accurate translations.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
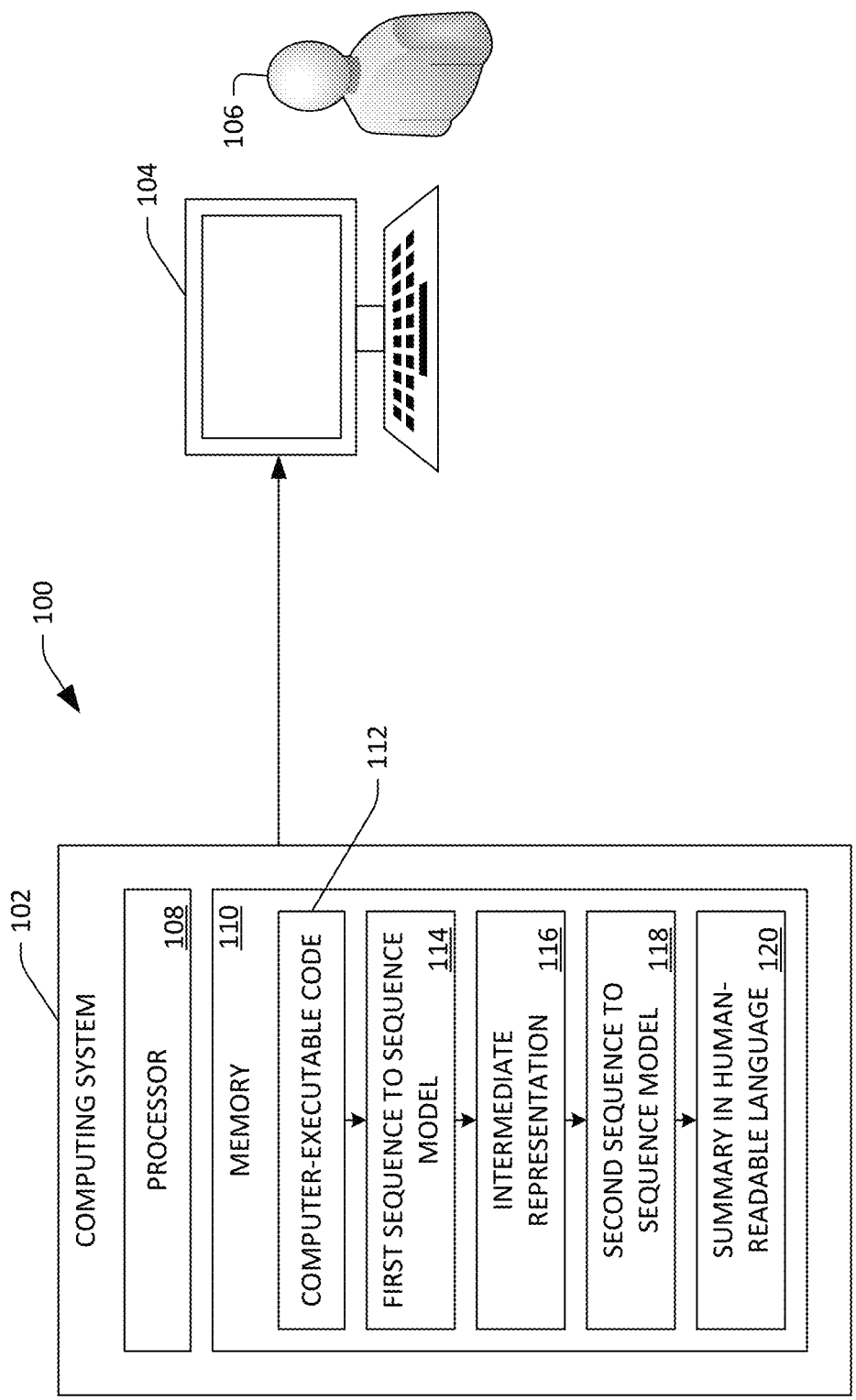
FIG. 1 is a functional block diagram of an exemplary computing system that is configured to translate a function in computer-executable code to a human-readable summary of such function.

Various technologies pertaining to generating human-readable summaries of binary code are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component, system, or module may be localized on a single device or distributed across several devices. Additionally, as used herein, the term "exemplary" is intended to mean serving as an illustration or example of something, and is not intended to indicate a preference.

Described herein are various technologies that facilitate translating computer-executable code (e.g., binary code) to a summary of the computer-executable code in a human readable language. As will be described in greater detail herein, a translation system can include a first computer-executable sequence to sequence model and a second computer-executable sequence to sequence model. The first sequence to sequence model is configured to receive computer-executable code, wherein the computer-executable code can be binary code or a derivative thereof, such as disassembled binary code or decompiled binary code. The first sequence to sequence model receives the computer-executable code and translates the computer-executable code to an intermediate representation of the computer-executable code. Pursuant to an example, the intermediate representation can be an approximation of source code that corresponds to the computer-executable code. The second sequence to sequence model is configured to receive the intermediate representation of the computer-executable code output by the first sequence to sequence model and is further configured to translate the intermediate representation into a human-readable summary of the intermediate representation (and thus a human-readable summary of the computer-executable code), wherein the human-readable summary is in a human-readable (and human spoken) language such as English, French, Spanish, German, Russian, Japanese, Chinese, etc. The human-readable summary can be output to a display of a computing device operated by an analyst, such that the analyst can understand operation of the computer-executable code. In an example, the analyst can be a reverse engineer who is tasked with performing reverse engineering on binary code, and the analyst can ascertain whether the binary code corresponds to malware based upon the human-readable summary of the computer-executable code.

With reference now to FIG. 1, a functional block diagram of an exemplary system 100 that facilitates translating from computer-executable code to a human-readable summary of the computer-executable code is illustrated. The system 100 includes a computing system 102 and a client computing device 104 that is operated by an analyst 106. The computing system 102 can be in communication with the client computing device 104 by way of a suitable network connection. The computing system 102 comprises a processor 108 and memory 110, where the memory 110 has instructions stored therein that are executed by the processor 108.

In addition, the memory 110 has computer-executable code 112 stored therein, wherein the analyst 106 has indicated that the computer-executable code 112 is to be subject to reverse engineering. The computer-executable code 112 includes a function that is performed by a processor when the processor executes the computer-executable code 112. In an example, the computer-executable code 112 can be binary code (e.g., in hexadecimal), wherein the source code for the computer-executable code 112 is unavailable. In another example, the computer-executable code 112 can be disassembled binary code, wherein binary code has been provided to a disassembler and the computer-executable code 112 is output by the disassembler. In yet another example, the computer-executable code 112 can be decompiled code, wherein binary code has been provided to a decompiler and the computer-executable code 112 is output by the decompiler.

The memory 110 further includes a first sequence to sequence model 114 that is configured to receive the computer-executable code 112 as input and output an intermediate representation 116 of the computer-executable code 112 based upon the computer-executable code 112. In an example, the intermediate representation 116 of the computer-executable code 112 can be an approximation of source code (in a programming language) that corresponds to the computer-executable code 112. For instance, the intermediate representation 116 of the computer-executable code 112 can be an approximation of source code in C, C++, JavaScript, Perl, or other suitable computer programming language. As will be described in greater detail herein, the first sequence to sequence model 114 is trained through use of training data that includes pairs of computer-executable code (e.g., binary code, disassembled binary code, or decompiled binary code) and source code that corresponds to the computer-executable code. Hence, the first sequence to sequence model 114 is trained to translate computer-executable code in binary, disassembled binary, or decompiled binary to (approximately) source code in a suitable programming language.

The memory 110 also comprises a second sequence to sequence model 118, wherein the second sequence to sequence model 118 is configured to receive the intermediate representation 116 of the computer-executable code 112 as input and output a summary 120 of the intermediate representation 116 in human-readable language (and thus a summary of the computer-executable code 112). The second sequence to sequence model outputs the summary 120 based upon the intermediate representation 116 of the computer-executable code 112. It is emphasized that the summary 120 is not in a computer programming language or an approximation thereof; rather, the summary 120 is set forth in a human-readable and human-spoken language, such as English, French, German, Russian, Spanish, Japanese, Chinese, etc. As will be described in greater detail below, the second sequence to sequence model 118 is trained based upon training data that includes pairs of source code (in the same a programming language as the source code used to train the first sequence to sequence model 114) and developer-generated comments for such source code that describe operation of function(s) in the source code. Hence, the second sequence to sequence model 118 is configured to translate from source code to summaries of the source code in a human-readable language.

Upon the second sequence to sequence model 118 outputting the summary 120 of the computer-executable code 112, the computing system 102 can be configured to transmit the summary 120 to the client computing device 104, whereupon the summary 120 can be presented on a display of the client computing device 104 for review by the analyst 106.

In operation, the analyst 106 can set forth input to the client computing device 104, where the input identifies the computer-executable code 112 that is to be subject to reverse engineering. The first sequence to sequence model 114 receives the computer-executable code 112 (or a derivative thereof) and outputs the intermediate representation 116 of the computer-executable code 112 based upon the computer-executable code 112. The second sequence to sequence model 118, upon the first sequence to sequence model 114 outputting the intermediate representation 116 of the computer-executable code 112, receives the intermediate representation 116 of the computer-executable code 112 as input and outputs the summary 120 (in human-readable language) of the computer-executable code 112. As noted previously, the computer-readable code 112 can include a function, and thus the summary 120 can be or include a human-readable summary of such function. The computing system 102 transmits the summary 120 to the client computing device 104, whereupon the summary 120 can be presented on the display of the client computing device 104 to the analyst 106.

The system 100 exhibits various advantages over conventional computer-implemented systems that are configured to assist analysts with reverse engineering binary code. For example, some analysts may be trained to interpret assembly code that is output by a disassembler; however, a significant amount of time is required by the analyst to interpret the assembly code. In contrast, the system 100 provides human-readable summaries of functions in binary code to analysts, thereby allowing the analysts to quickly ascertain whether a function may correspond to malware.

Figure 2:
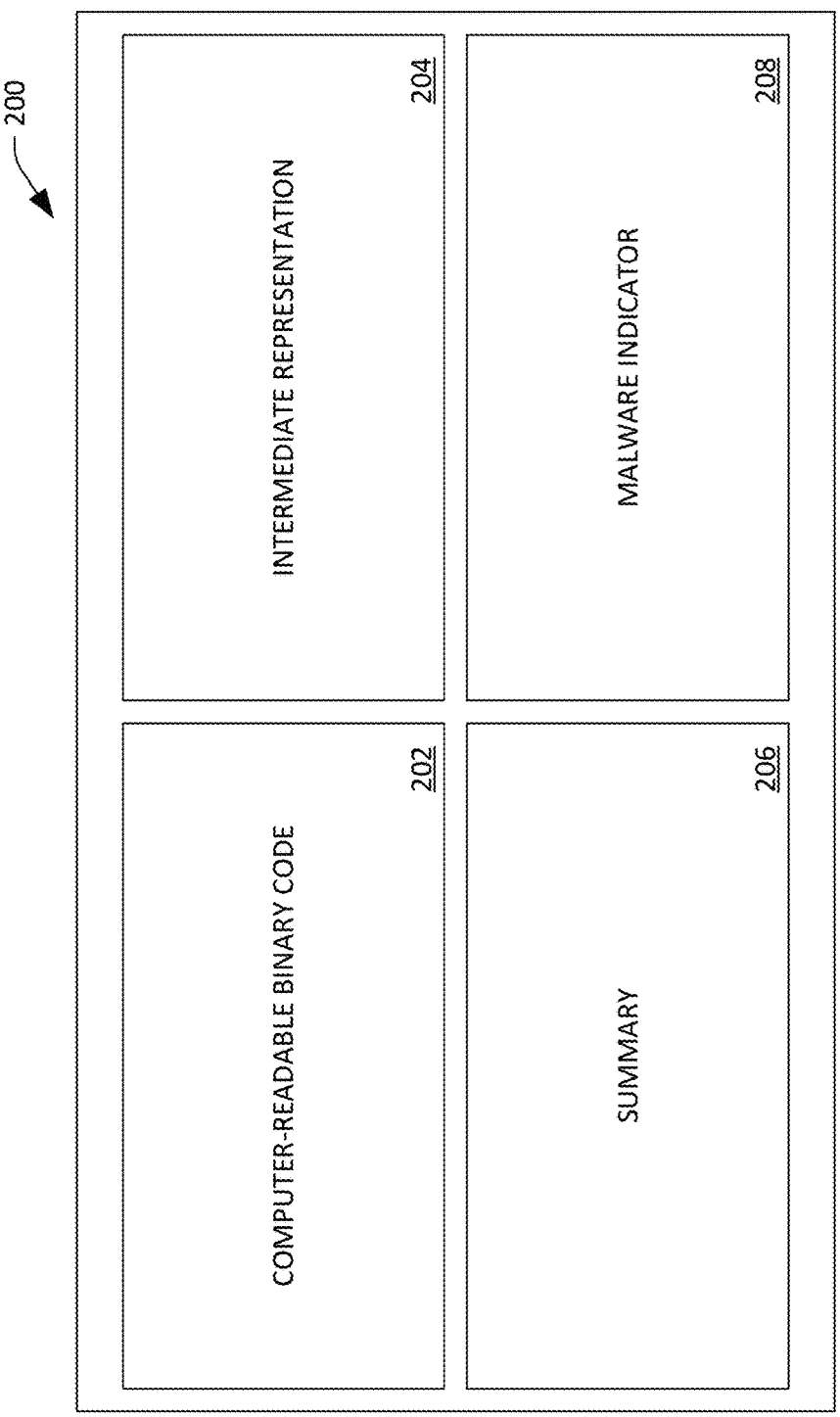
FIG. 2 depicts an exemplary graphical user interface that includes a field that depicts human-readable summaries of computer-executable code.

Now referring to FIG. 2, an exemplary graphical user interface 200 that can be presented on the display of the client computing device 104 operated by the analyst 106 is illustrated. The graphical user interface 200 includes a first field 202 that can present at least a portion of the computer-executable code 112 to the analyst 106. For example, the first field 202 can include a function in binary code. The graphical user interface 200 may further optionally include a second field 204 that presents the intermediate representation 116 of the computer-executable code 112 output by the first sequence to sequence model 114 to the analyst 106. The intermediate representation 116 depicted in the second field 204 corresponds to the computer-executable code 112 depicted in the first field 202.

The graphical user interface 200 also includes a third field 206 that depicts the summary 120 of the computer-executable code 112 to the analyst 106. Thus, the analyst 106 is presented with the summary 120 in graphical relation to the computer-executable code 112. While the third field 206 is presented in FIG. 2 as being beneath the first field 202, it is to be understood that the third field 206 may be beside the first field 202 such that the computer-executable code 112 is presented side-by-side with the summary 120.

Additionally, and optionally, the graphical user interface 200 can include a fourth field 208 that can present a malware indicator to the analyst 106. The malware indicator can indicate to the analyst 106 that the computer-executable code 112 presented in the first field 202 has been identified as potentially including malware. For instance, malware identification software can be provided with one or more of the computer-executable code 112, the intermediate representation 116 output by the first sequence to sequence model 114, or the summary 120 output by the second sequence to sequence model 118. The malware identification software can ascertain that the computer-executable code 112 may include malware based on one or more of the computer-executable code 112, the intermediate representation 116, or the summary 120. When the malware identification software ascertains that the computer-executable code 112 may include malware, the graphical user interface 200 can depict a malware indicator in the fourth field 208. The analyst 106 may thus perform further analysis to confirm that the computer-executable code 112 has malware included therein or determine that the computer-executable code 112 is free of malware.

Figure 3:
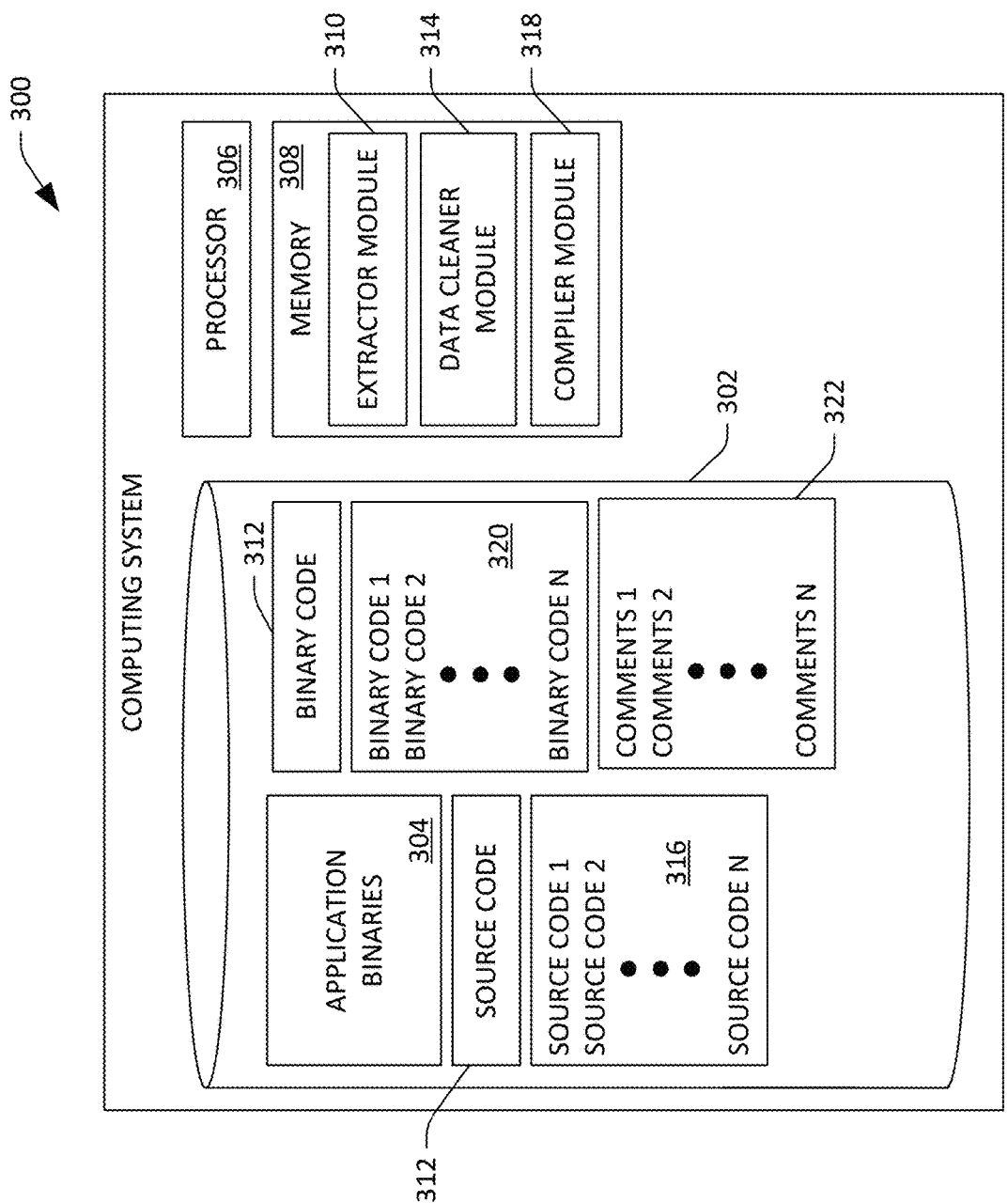
FIG. 3 is a functional block diagram of an exemplary computing system that is configured to generate training data for training sequence to sequence models.

Now referring to FIG. 3, a functional block diagram of an exemplary computing system 300 that is configured to process application binaries in connection with generating training data for training the first sequence to sequence model 114 and the second sequence to sequence model 118 is illustrated. The computing system 300 includes a data store 302 that is configured to store computer-readable data. The data store 302 can store application binaries 304 that are retrieved from an open-source repository, wherein each of the application binaries 304 comprises code compiled with debug information such that source code (including comments) is preserved within the application binaries 304.

The computing system 300 further includes a processor 306 and memory 308, wherein the memory 308 includes instructions that are executed by the processor 306. With more specificity, the memory 308 includes an extractor module 310 that is configured to extract information from the application binaries 304. For instance, the extractor module 310 can receive the application binaries 304 and can extract source code 312 therefrom. The extractor module 310 can cause the source code 312 to be stored in the data store 302. For example, the source code 312 can include source code and corresponding comments for various different applications and functions.

The memory 308 additionally comprises a data cleaner module 314 that is provided with the source code 312 extracted from the application binaries 304 by the extractor module 310. The data cleaner module 314 performs a variety of operations with respect to the source code 312. For instance, the data cleaner module 314 can partition the source code 312 into N portions of source code 316; in an example, each of the N portions of source code 316 can correspond to a function. In another example, each of the N portions of source code can correspond to an application. The data cleaner module 314 can then normalize the N portions of source code 316. For example, unlike human-readable languages, the vocabulary in source code is infinite, as a developer may employ any suitable combination of characters when defining variables, may include any suitable numerical value in source code when performing a function, and so forth. The data cleaner module 314, in an example, can normalize variable names by replacing variable names with names from a predefined list. In another example, the data cleaner module 314 can search for values of a certain format (such as telephone numbers) and replace such numbers with a normalized value. In still yet another example, the data cleaner module 314 can search the N portions of source code 316 for Uniform Resource Locators (URLs) and can replace the URLs with a standard value. These processes are unique to source code and are distinct from operations that are undertaken on human-readable text in human-readable languages, due to the infinite vocabulary that can be used in source code. The data cleaner module 314 can also tokenize the source code; for instance, the data cleaner module 314 can tokenize the source code based upon white spaces between characters in source code, where each token is analogous to a word in human-readable language. The data cleaner module 314, in an exemplary embodiment, can optionally perform similar operations with respect to binary code or derivatives of the binary code to preprocess such binary code (or its derivatives).

Prior to or subsequent to the data cleaner module 314 performing the above-referenced processing on the N portions of source code 316, the extractor module 310 can extract comments 322 from the source code 312 and/or the application binaries 304. The extractor module 310 can partition the comments into a set of N comments 322, with each of the N comments mapped to a respective portion of source code in the N portions of source code 316. The data cleaner module 314 can tokenize the comments in the N set of comments based upon whitespace between words in the comments.

The memory 308 also includes a compiler module 318 that is configured to compile source code and generate machine code (e.g., binary code). Subsequent to the data cleaner module 314 performing the above-described processing on the N portions of source code 316, the N portions of source code 316 are provided to the compiler 318. The compiler 318 compiles the N portions of source code 316 and outputs N portions of binary code 320 that respectively correspond to the N portions of source code 316. A mapping is maintained between the N portions of source code 316 and the N portions of binary code 320—for example, the first portion of source code is mapped to the first portion of binary code, the second portion of source code is mapped to the second portion of binary code, and so forth. The data cleaner module 314 can tokenize the N portions of binary code 320 utilizing any suitable tokenization approach. For instance, the data cleaner module 314 can tokenize the binary code based upon whitespace between characters in the binary code. In another example, the data cleaner module 314 can employ binary pair encoding to tokenize the N portions of binary code 320. In yet another example, the data cleaner module 314 can tokenize the N portions of binary code by dividing the binary code into sub-words. Other approaches are contemplated.

Additionally, while not depicted, optionally the memory 308 can include a disassembler and/or a decompiler, wherein the N portions of the binary code 320 can be provided to the disassembler or decompiler, resulting in N portions of disassembled or decompiled binary code. In this example, the binary code 320 is intended to encompass raw binary code, disassembled binary code, and decompiled binary code.

Figure 4:
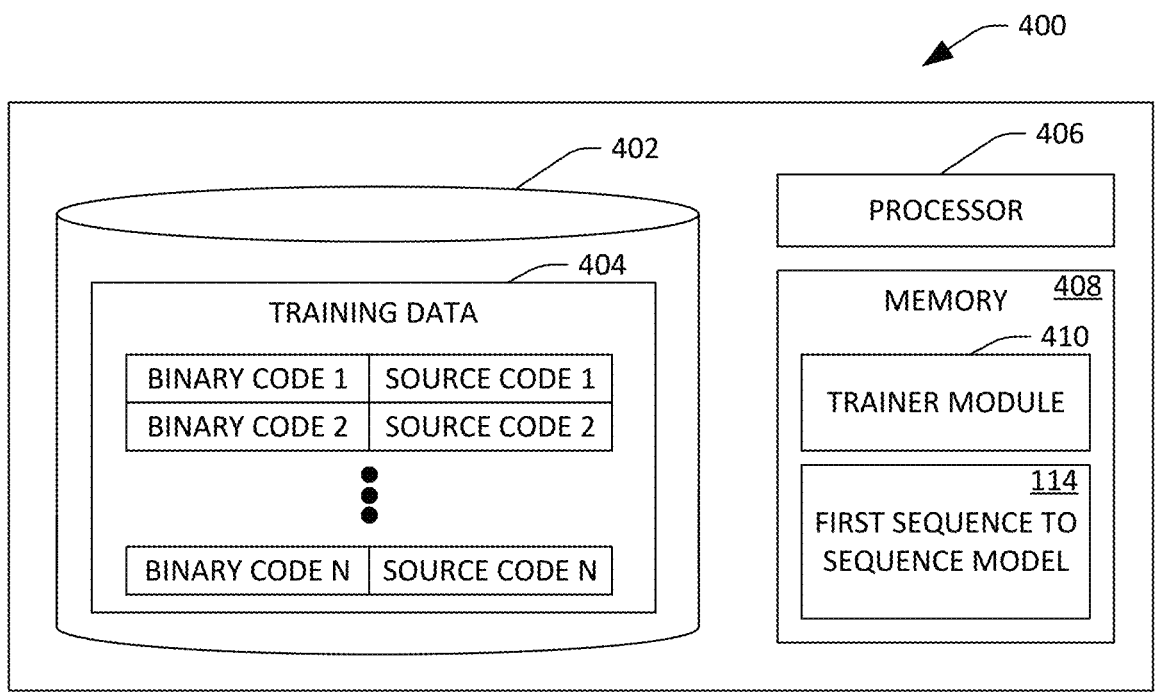
FIG. 4 is a functional block diagram of an exemplary computing system that is configured to train a first sequence to sequence model based upon training data that includes pairs of binary code and corresponding source code.

Now referring to FIG. 4, a functional block diagram of an exemplary computing system 400 that is configured to train the first sequence to sequence model 114 such that the first sequence to sequence model 114 is able to translate from one of binary code, disassembled binary code, or decompiled binary code to an approximation of source code is illustrated. The computing system 400 includes a data store 402 that comprises training data 404. The training data 404 includes pairs of tokenized binary code and tokenized source code, wherein each pair includes a portion of binary code (whether it is binary hex, disassembled binary, or decompiled binary) and a portion of source code that corresponds to the portion of binary code. As illustrated in FIG. 4, the training data 404 includes N pairs of binary code and source code, with each pair including a portion of binary code and a corresponding portion of source code.

The computing system 400 additionally includes a processor 406 and memory 408, wherein the memory 408 includes instructions that are executed by the processor 406. Specifically, the memory 408 includes a trainer module 410. The trainer module 410 receives the pairs of binary code and source code in the training data 404 and trains the first sequence to sequence model 114 to translate from binary code to an approximation of source code based upon the pairs of training data. As described previously, once trained, the first sequence to sequence model 114 can be configured to receive binary code (or disassembled binary code or decompiled binary code) and output an approximation of source code that corresponds to such binary code.

Figure 5:
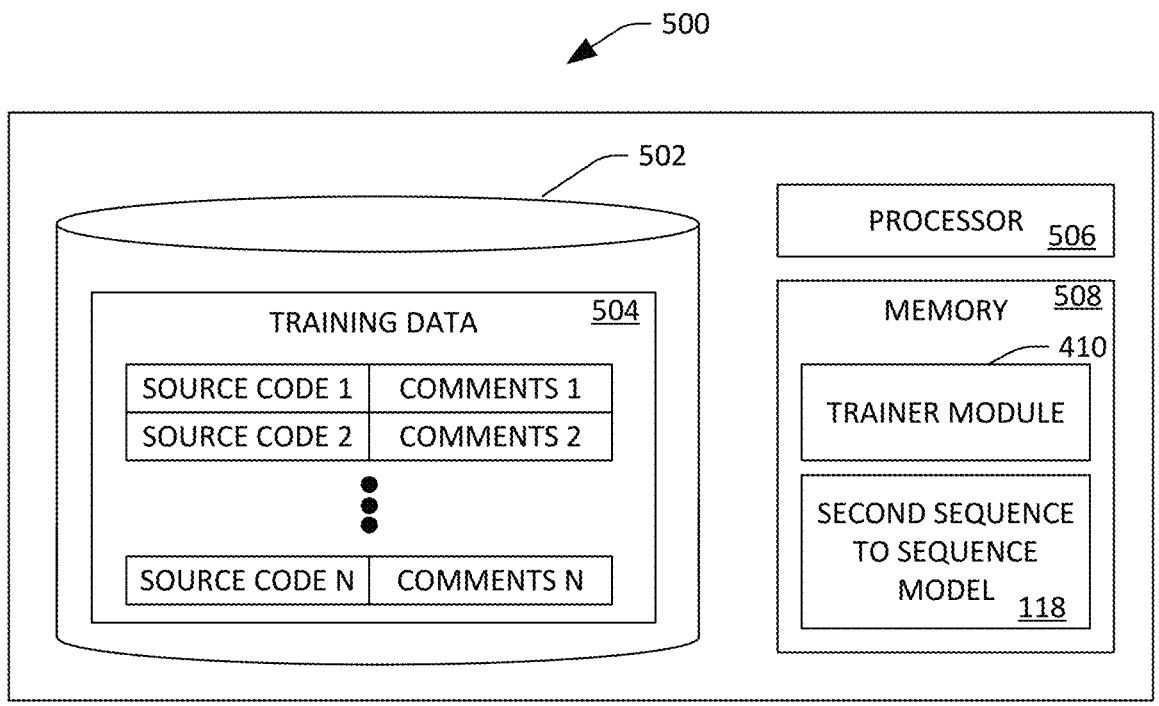
FIG. 5 is a functional block diagram of an exemplary computing system that is configured to train a second sequence to sequence model based upon training data that includes pairs of source code and comments corresponding to the source code.

Now referring to FIG. 5, an exemplary computing system 500 that is configured to train the second sequence to sequence model 118 is illustrated. The computing system 500 includes a data store 502 that comprises training data 504, wherein the training data 504 includes several pairs of portions of source code and comments that correspond to such source code (where the comments describe the portions of the source code). More specifically, the training data 504 includes a first pair of training data that comprises a first portion of source code and first comments that describe the first portion of source code, a second pair of training data that comprises a second portion of source code and second comments that describe such portion of source code, and so forth.

The computing system 500 additionally comprises a processor 506 and memory 508, wherein the processor 506 executes instructions that are stored in the memory 508. The memory 508 includes the trainer module 410, wherein the trainer module 410 is configured to train the second sequence to sequence model 118 based upon the training data 504 stored in the data store 502. As described previously, once trained, the second sequence to sequence model 118 is configured to translate from an approximation of source code to human-readable summaries that correspond to such source code.

Figure 6:
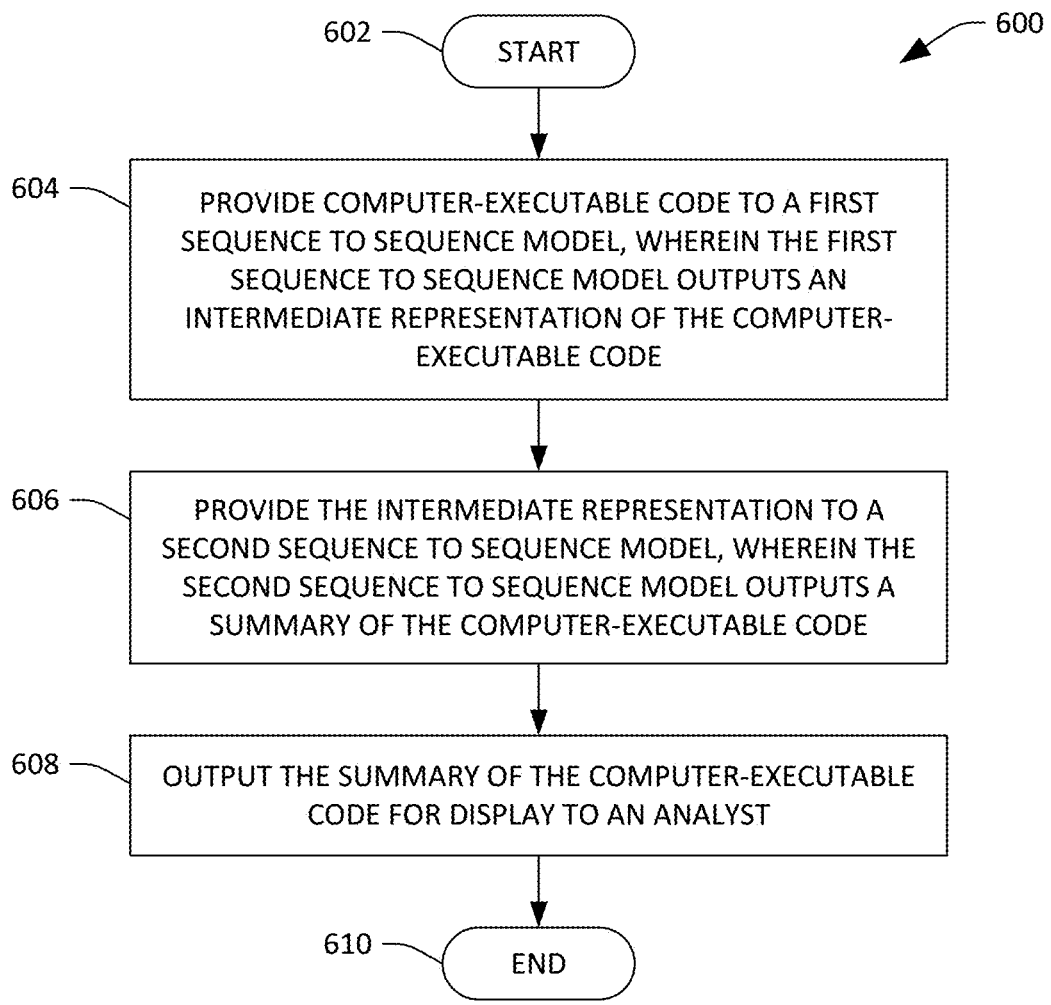
FIG. 6 is a flow diagram that illustrates an exemplary methodology for translating a function in binary code to a human-readable summary of such function.

FIG. 6 illustrates an exemplary methodology relating to generating human-readable summaries of binary code. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference to FIG. 6, a flow diagram illustrating an exemplary methodology 600 for outputting a human-readable summary of binary code for the purpose of reverse engineering is illustrated. The methodology 600 starts at 602, and at 604, computer-executable code is provided to a first sequence to sequence model. The computer-executable code can be binary code, decompiled binary code, disassembled binary code, or the like. The computer-executable code can be identified by an analyst as being desirably subject to reverse engineering. The first sequence to sequence model, upon being provided with the computer-executable code, outputs an intermediate representation of the computer-executable code. For example, the intermediate representation of the computer-executable code can be an approximation of source code that corresponds to the computer-executable code, wherein the approximation of source code may be an approximation of source code in C, C++, etc.

At 606, the intermediate representation of the computer-executable code is provided to a second sequence to sequence model. The second sequence to sequence model is configured to translate the intermediate representation of the computer-executable code to a summary of the computer-executable code in a human-readable (and spoken) language.

At 608, the summary of the computer-executable code output by the second sequence to sequence model is caused to be presented on a display to an analyst who indicated that the computer-executable code was to be subject to reverse engineering. Optionally, the computer-executable code, the intermediate representation of the computer-executable code, and/or the summary of the computer-executable code can be provided to a malware detection system and an indication as to whether or not the computer-executable code may correspond to malware may be presented to the analyst on a display of the client computing device. The methodology 600 completes at 610.

Figure 7:
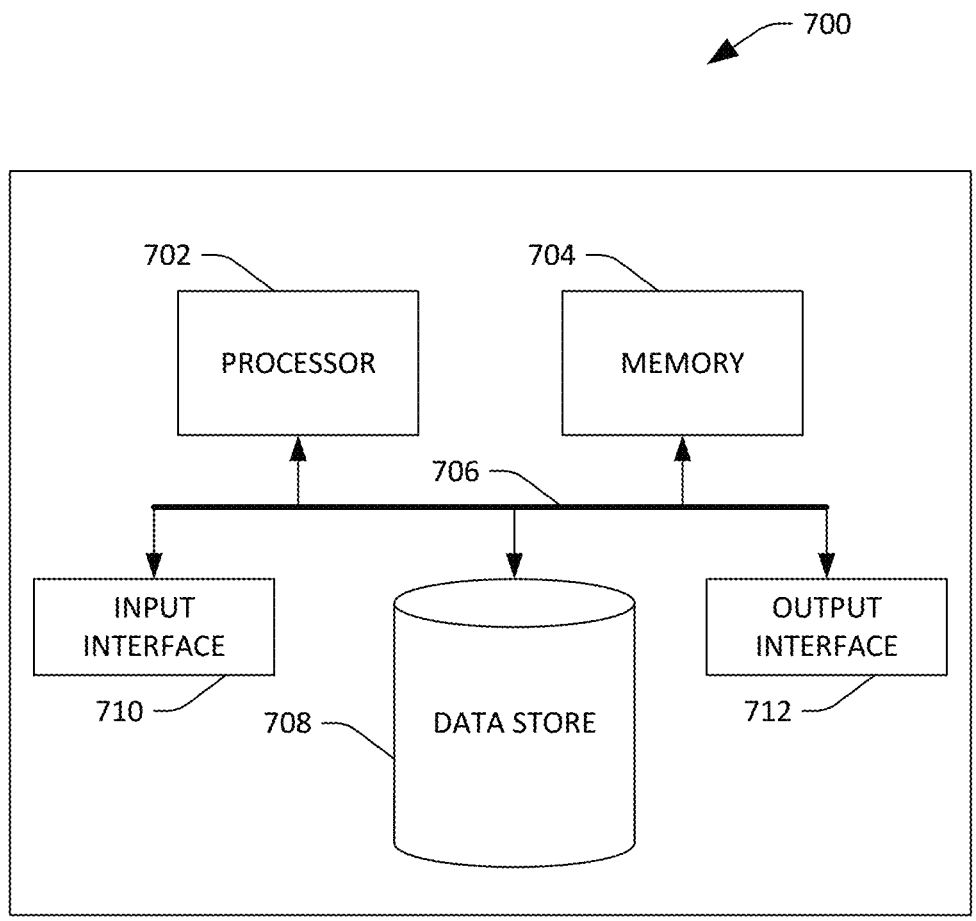
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that generates a human-readable summary of binary code based upon the binary code. By way of another example, the computing device 700 can be used in a system that is configured to generate training data for training sequence to sequence models. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store binary code, source code, human-readable summaries of binary code, comments, application binary files, etc.

The computing device 700 additionally includes a data store 708 that is accessible by the processor 702 by way of the system bus 706. The data store 708 may include executable instructions, application binary files, source code, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc., by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system that is configured to generate a summary of a function in computer-executable code, the computing system comprising:
    a processor; and
    memory storing instructions that, when executed by the processor, cause the processor to perform acts comprising:
        providing the computer-executable code to a first sequence to sequence model, where the computer-executable code is one of:
        binary code;
        disassembled binary code; or
        decompiled binary code;
        wherein the computer-executable code comprises the function, and further wherein the first sequence to sequence model outputs an intermediate representation of the function based upon the computer-executable code, the intermediate representation of the function being an approximation of source code for the function, and wherein the first sequence to sequence model is trained based upon first training data, the first training data comprises pairs of disassembled binary code portions and corresponding functions in source code;
        providing the intermediate representation of the function to a second sequence to sequence model, wherein the second sequence to sequence model outputs the summary of the function in human-readable language based upon the intermediate representation of the function; and
        outputting the summary of the function for presentment on a display associated with the computing system to an analyst.

2. The computing system of claim 1, wherein the second sequence to sequence model is trained based upon second training data, the second training data comprises pairs of the functions in source code and corresponding comments assigned to the functions, wherein the comments are in the human-readable language.

3. The computing system of claim 1, wherein the human-readable language is English.

4. The computing system of claim 1, the acts further comprising:
    identifying, based upon the summary of the function in the human-readable language, that the function in the computer-executable code is associated with malware; and
    causing a graphical indicator to be presented on the display with the summary of the function, the graphical indicator indicates to the analyst that the function in the computer-executable code is associated with malware.

5. The computing system of claim 1, the acts further comprising:
    outputting the intermediate representation of the function for presentment on the display concurrently with the summary of the function in human-readable language.

6. The computing system of claim 1, the acts further comprising:
    assigning the summary of the function in the human-readable language as a comment to source code that corresponds to the computer-executable code.

7. The computing system of claim 1, wherein the computer-executable code is disassembled binary code.

8. The computing system of claim 1, wherein the computer-executable code is binary code.

9. A method performed by a processor of a computing system, the method comprising:
    receiving computer-executable code that includes a function, the computer-executable code being one of:
    binary code;
    disassembled binary code; or
    decompiled binary code;
    generating an intermediate representation of the computer-executable code, wherein generating the intermediate representation comprises providing the computer-executable code as input to a first sequence to sequence model, wherein the first sequence to sequence model outputs the intermediate representation of the computer-executable code based upon the computer-executable code, and further where the intermediate representation is an approximation of source code for the computer-executable code;
    generating a summary of the function in the computer-executable code, wherein the summary is in a human-readable language, and further wherein generating the summary of the function comprises providing the intermediate representation of the computer-executable code as input to a second sequence to sequence model, wherein the second sequence to sequence model outputs the summary based upon the intermediate representation of the computer-executable code;
    outputting the summary of the function to a display of a computing device operated by an analyst;
    determining, based upon the summary of the function, that the function in the computer-executable code is associated with malware; and
    outputting an indication to the display of the computing device that the function in the computer-executable code is associated with malware.

10. The method of claim 9, wherein the computer-executable code is binary code.

11. The method of claim 9, wherein the computer-executable code is disassembled binary code.

12. The method of claim 9, wherein the intermediate representation of the computer-executable code is an approximation of source code in C or C++ for the computer-executable code.

13. The method of claim 9, wherein the first sequence to sequence model is trained based upon pairs that comprise binary code and corresponding source code for the binary code.

14. The method of claim 13, wherein the second sequence to sequence model is trained based upon pairs that comprise source code and comments for the source code.

15. A computer-readable storage medium comprising instructions that, when executed by a processor, cause the processor to perform acts comprising:
   providing computer-readable disassembled binary code to a first sequence to sequence model, wherein the computer-readable disassembled binary code comprises a function, and further wherein the first sequence to sequence model outputs an intermediate representation of the function based upon the computer-readable disassembled binary code, the intermediate representation being an approximation of source code for the computer-readable disassembled binary code, and further wherein the first sequence to sequence model is trained based upon first training data, the first training data comprises pairs of disassembled binary code portions and corresponding functions in source code;
   providing the intermediate representation of the function to a second sequence to sequence model, wherein the second sequence to sequence model outputs the summary of the function in human-readable language based upon the intermediate representation of the function; and
   outputting the summary of the function for presentment on a display associated with the computing system to an analyst.

16. The computer-readable storage medium of claim 15, the acts further comprising:
   determining, based upon the summary of the function, that the function in the disassembled binary code is associated with malware; and
   outputting an indication to the display of the computing device that the function in the disassembled binary code is associated with malware.

17. The computer-readable storage medium of claim 15, wherein the second sequence to sequence model is trained based upon second training data, the second training data comprises pairs of the functions in source code and corresponding comments assigned to the functions, wherein the comments are in the human-readable language.

* * * * *